United States Patent [19]
Fujieda et al.

[11] Patent Number: 5,446,290
[45] Date of Patent: Aug. 29, 1995

[54] FINGERPRINT IMAGE INPUT DEVICE HAVING AN IMAGE SENSOR WITH OPENINGS

[75] Inventors: Ichiro Fujieda; Yuzo Ono; Seijin Sugama, all of Tokyo, Japan

[73] Assignee: NEC Corporation, Tokyo, Japan

[21] Appl. No.: 240,568

[22] Filed: May 11, 1994

[30] Foreign Application Priority Data

May 13, 1993 [JP] Japan .................................. 5-110827

[51] Int. Cl.⁶ ............................................. G06K 5/00
[52] U.S. Cl. ................................ 250/556; 250/227.11; 356/71
[58] Field of Search ................ 250/556, 557, 227.11, 250/227.19, 227.2, 227.22; 382/415, 8; 356/71, 73.1

[56] References Cited

U.S. PATENT DOCUMENTS

| | | | |
|---|---|---|---|
| 4,206,441 | 6/1980 | Kondo ................................. | 356/71 |
| 4,358,677 | 11/1982 | Ruell et al. .......................... | 356/71 |

FOREIGN PATENT DOCUMENTS 61-277252 12/1986 Japan .
2-260568 10/1990 Japan .
3-154564 7/1991 Japan .

OTHER PUBLICATIONS

Okumura et al., "Fingerprint Sensor Using Light-Separation Method with Silicon Rubber", Autumn Meeting of the Applied Physics Society of Japan, 18P-N-14, Jan. 1992.

*Primary Examiner*—David C. Nelms
*Assistant Examiner*—Que T. Le
*Attorney, Agent, or Firm*—Foley & Lardner

[57] ABSTRACT

A two-dimensional image sensor 12 having openings 28 through which light can pass is formed on a transparent substrate 21 and combined with a planar light source 11 and an optical element 13 which defines optical paths. The optical element 13 is formed by combining one of a diffraction grating, a microlens and a specular surface of V-shaped grooves with a collected fiber member formed from bundled optical fibers having light shielding side faces so as to allow the transfer of an image. The profiles of these components are determined so that light may be focused upon a finger contacting area on the center line between the openings 28 and photo-sensitive elements 24 of the sensor 12.

12 Claims, 4 Drawing Sheets

FINGERPRINT IMAGE INPUT DEVICE HAVING AN IMAGE SENSOR WITH OPENINGS

BACKGROUND OF THE INVENTION

1. Field of the Invention

This invention relates to a fingerprint image input device, and more particularly to a thin and compact fingerprint image input device.

2. Description of the Prior Art

Conventionally, in a fingerprint image input device of the type mentioned, a fingerprint image is inputted to an image sensor after the brightness thereof is emphasized optically in order to obtain a high signal to noise ratio as disclosed, for example, in Shinichi Okumura and Masayuki Yamazaki, "Fingerprint Sensor by an Optical Path Separation Method Using Silicon Rubber," Autumn Meeting of the Applied Physics Society of Japan, 18P-N-14, 1992. FIG. 1 is a block diagram showing an example of a conventional fingerprint image input device. The conventional fingerprint image input device shown is constituted from the combination of prism 2, CCD camera 4, and light source 3. The fingerprint image input device functions in the following manner: Light emitted from the light source 3 is applied obliquely onto a finger 1. When the light comes upon a ridgeline of the fingerprint, total reflection of the light is not established between the prism 2 and the finger 1, causing the light to be scattered in all directions. As a result, the amount of light arriving at the CCD camera 4 through prism 2 is reduced. When light from the light source 3 does not come upon any ridgeline of the fingerprint, almost all of the light reaches the CCD camera 4 through prism 2 by total reflection. An image of finger 1 for which brightness is optically emphasized in this manner can be detected by CCD camera 4. It is to be noted that the incident angle of light to the finger 1 has an optimum range and hence the device must be designed so that the optimum range is always provided. If the device is designed so that light is applied onto the finger approximately normal thereto, the effect of optical emphasis in the brightness cannot be produced.

Meanwhile, as a conventional compact image input device, an image sensor of the full contact type such as disclosed, for example, in Japanese Patent Laid-Open No. Heisei 2-260568(1990) has been proposed and is adopted for use in a facsimile or an image scanner. FIG. 2 is an illustrative view showing the construction of the image sensor of the full contact type. A large number of sensor elements 102 are disposed one-dimensionally on a glass substrate 101 and combined with a collected fiber member 105 through a passivation film 103 and adhesive 104 so as to be opposed to an original 106. The image sensor functions in the following manner. Light emitted from a light source not shown is transmitted through the glass substrate 101 and collected fiber member 105 to the original 106. Part of the reflected light from the original 106 enters the collected fiber member 105 and is totally reflected repeatedly within the fibers until it comes to the sensor elements 102, where signal outputs are obtained from the sensor elements 102. By scanning the original 106 to read out signals continuously, a two-dimensional image can be inputted. Another image sensor of the full contact type has been proposed and is disclosed in Japanese Patent Laid-Open No. 3-154564(1991). FIG. 3 is an illustrative view showing the construction of the image sensor of the full contact type just described. The image sensor is constituted from the combination of a light emitting diode (LED) 107, a large number of sensor elements 102 disposed one-dimensionally on a transparent substrate 108, and a transparent glass case 109 into which optical fibers 110 are incorporated in such a manner as to be disposed obliquely relative to the sensor elements 102, and opposed to an original 106. The image sensor functions in the following manner. Light emitted from the light emitting diode (LED) 107 is transmitted through the glass case 109 to the original 106. Part of the light reflected by the original 106 enters the optical fibers 110 and is totally reflected repeatedly within the fibers until it comes to sensor elements 102, where signal outputs are obtained from the sensor elements 102. By scanning the original 106 to read out signals continuously, a two-dimensional image can be inputted.

However, with the conventional fingerprint image input device described above, since the prism 2 and CCD camera 4 are bulky, the optical path has a length of several cm or more. Accordingly, it is difficult to construct the device in a compact size.

Meanwhile, when it is attempted to construct a fingerprint image input device employing the conventional image sensors of the full contact type as described above, the following problems are involved. Firstly, a mechanical means is required for the conventional image sensor of the full contact type to scan a fingerprint. As a result, it is difficult to construct the device in a compact size. This problem could be eliminated if sensor elements can be disposed two-dimensionally to make up a two-dimensional image sensor. However, a second problem remains. This problem relates to the contrast of an output image. When a construction is employed wherein the original 106 is replaced by a finger 1 in the image sensor of the full contact type shown in FIG. 2, light is approximately normal to the finger 1 at the point of incidence. This does not allow the utilization of total reflection of light to emphasize the brightness of a fingerprint image. Thus, an image having a high contrast cannot be obtained.

On the other hand, the construction of the image sensor of the full contact type shown in FIG. 3 can be modified by moving the position of the light emitting diode 107 to apply incident light obliquely onto the finger 1 (refer to, for example, Japanese Patent Laid-Open No. 61-277252 [1986]). In this instance, while a possible modification can be made by using a technique equivalent to the conventional technique which makes use of total reflection, it is impossible to arrange sensor elements 102 and optical fibers 110 two-dimensionally, and therefore, it is difficult to provide a device of compact construction.

SUMMARY OF THE INVENTION

It is an object of the present invention to provide a thin and compact fingerprint image input device by solving the problems described above.

According to the present invention, a fingerprint image input device comprises: a two-dimensional image sensor formed on a transparent substrate and an optical means for defining optical path, both being disposed on the planar light source, wherein light emitted from the planar light source is transmitted through the transparent substrate so as to be applied obliquely onto a finger, and the light reflected from the finger passes through routes different from the optical paths of the incident light and arrives at a photo-sensitive elements of the two-dimensional image sensor.

The optical means includes a diffraction grating and a protective film for protecting the diffraction grating from the finger.

The optical means may include a microlens array in place of the diffraction grating and the protective film or alternatively may include a protective film on which V-shaped grooves are formed.

Alternatively, the optical means may have a construction such that a collected fiber member comprising a large number of bundled optical fibers and having light shielding surfaces on their sides is interposed between the two-dimensional image sensor and either one of the diffraction grating, microlens array, and protective film on which V-shaped grooves are formed.

Further, the fingerprint image input device can be combined with a liquid crystal light valve to provide a thin fingerprint image input device with a display.

The liquid crystal light valve and the fingerprint image input device may be stacked or disposed parallel to each other.

Further, the fingerprint image input device may be constructed such that a cover is placed over the fingerprint image input device and a second optical means is disposed to form an image of any object placed on the cover on the two-dimensional image sensor of the fingerprint image input device and the cover has a finger insertion hole formed therein to allow insertion of finger so that the fingerprint image input device can read images of both objects, the finger and object disposed at short and long distances, respectively.

Since the fingerprint image input device of the present invention employs a planar light source and a two-dimensional image sensor which has openings, the sensor need not be moved relative to the fingerprint, and hence, the device can be constructed in a compact size. Further, since the fingerprint image input device comprises an optical means for guiding the light that has passed through the openings so as to apply the light obliquely onto the finger, the brightness of the image of the fingerprint can be emphasized, thereby forming an image having high contrast.

Further, by merely placing a cover onto the fingerprint image input device, objects at both short and long distances can be read.

DETAILED DESCRIPTION OF THE PREFERRED EMBODIMENTS

Figure 4:
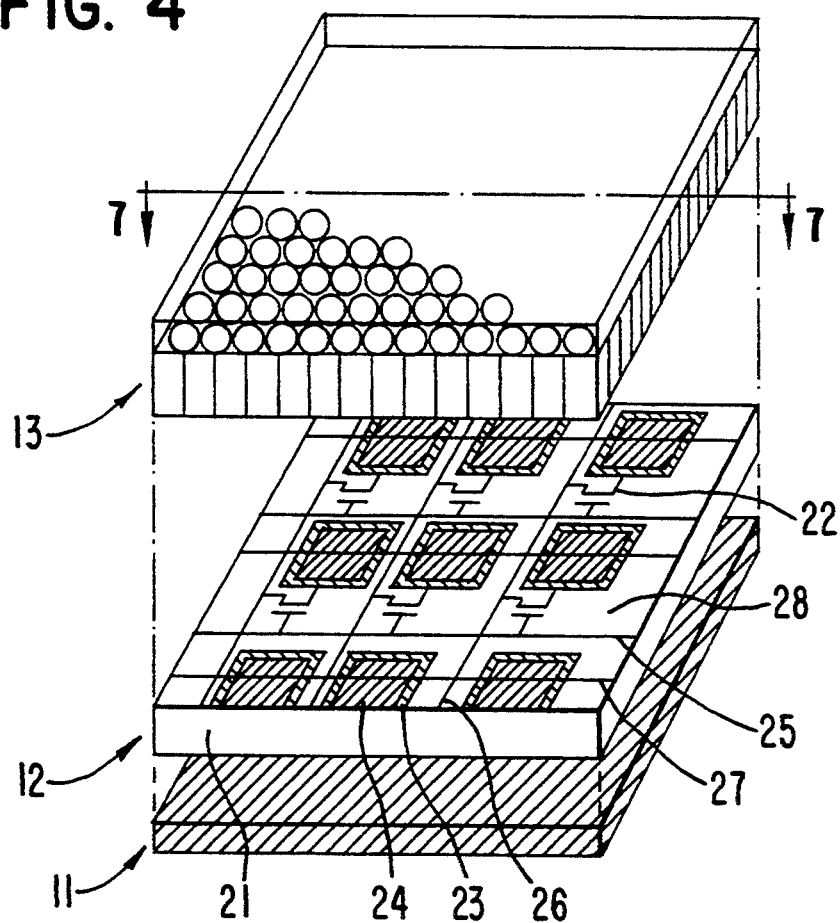
FIG. 4 is a perspective view showing the construction of an embodiment of a fingerprint image input device according to the present invention.

The present invention will now be described with reference to the drawings. FIG. 4 is a perspective view showing the construction of any embodiment of the present invention. A two-dimensional image sensor 12 and optical element 13 which defines optical paths are arranged on a planar light source 11. The upper face of the optical element 13 serves as a contact surface for a finger. The entire surface area of the optical element is 2 to 3 square cm, which is sufficient for a finger. The thickness is 2 to 5 mm for the planar light source, about 1 mm for the two-dimensional image sensor, and about 1 mm for the optical element. The planar light source 11 can be constructed using, for example, a backlight module for a liquid crystal display unit which employs an EL light emitting element or a tubular fluorescent lamp. The two-dimensional image sensor 12 includes a large number of picture elements arranged two-dimensionally at a pitch of about 50 μm on a transparent substrate 21 of glass or some other suitable material wherein each picture element is constituted from a photo-sensitive element 24 such as an amorphous silicon (a-Si) photodiode, a signal reading switch 22 such as an a-Si or polycrystalline silicon (polySi) thin film transistor (TFT) or a blocking diode, and a light shielding plate 23. The photo-sensitive element 24 is formed on the light shielding plate 23 and connected to a terminal of the switch 22. Further, the switch 22 is connected to a signal reading line 26 and switching line 25, and an end of the photo-sensitive element 24 is connected to a bias applying line 27. An opening 28 is provided in an area which is not occupied by the lines 25, 26 and 27 or the light shielding plates 23. The optical element 13 which defines the optical paths is constructed so that light may be focused on the finger contact area along the center lines between the openings 28 and photo-sensitive element 124. Details are described with reference to FIG. 7.

Figure 7:
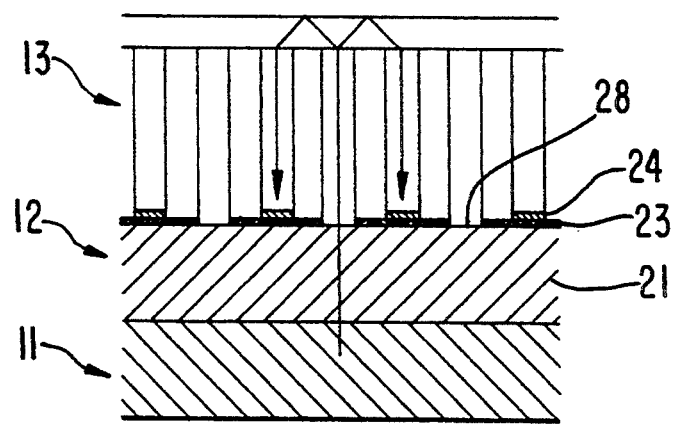
FIG. 7 is a sectional view taken along line A-A' of FIG. 4.

FIG. 7 is a sectional view taken along line A-A' in FIG. 4. The functioning of the present embodiment is described below with reference to FIG. 7. Light emitted from the planar light source 11 passes through a transparent substrate 21 and optical element 13 which defines optical paths, and is applied obliquely onto a finger placed in contact with the optical element 13. Light reflected from an interface between the finger and the optical element 13 reaches the photo-sensitive element 24 by passing through routes different from the optical paths of the incident light, as seen from FIG. 7. The light shielding plates 23 prevent the light from the planar light source 11 from being directly applied to the photosensitive element 24.

Figure 8:
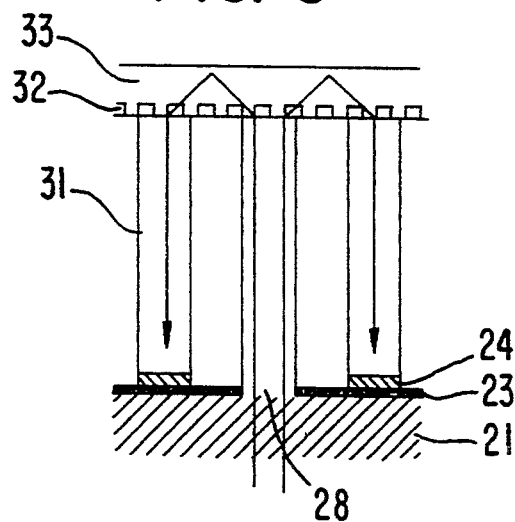
FIG. 8 is a sectional view showing details of a first embodiment of component 13 of FIG. 7.

Further, several embodiments of optical element 13 which defines optical paths will be described. In the construction shown in FIG. 8, a diffraction grating 32 is disposed on the upper face of a collected fiber member 31, which is produced by bundling a large number of optical fibers having light shielding side faces such as, for example, fiber optic windows (FOWs), and a protective film 33 for a finger contacting area is disposed so as to cover the upper face of a diffraction grating 32. The diffraction grating 32 can be prepared by forming grooves on the upper face of the collected fiber member 31 by photolithography or a like technique and by leveling the upper face of the member 31 with protective film 33 or by adhering the protective film 33, in which the grooves are formed, to the collected fiber member 31. The collected fiber member 31 and protective film 33 have a thickness of about 1 mm and 10 to 50 μm respectively, and the fiber diameter of the collected fiber member 31 is approximately 5 to 25 μm. The optical element 13 functions in the following manner. Light that has passed through an opening 28 of a two-dimensional image sensor is totally reflected repeatedly within the fibers of the collected fiber member 31 until it reaches the diffraction grating 32. Light which does not meet the requirements of total reflection at the side faces of the fibers is absorbed by absorbing elements disposed among the fibers. The light arriving at the diffraction grating 32 is diverted by diffraction so that it is applied obliquely to the upper face of the protective film 33. The protective film 33 protects the diffraction gratings from the finger and provides a space through which light is transmitted. When total reflection occurs at the interface between the finger and the protective film 33, the reflected light follows routes axially symmetrical to those of the incident light until it reaches the photo-sensitive element 24. When total reflection does not occur at the interface between the finger and protective film 33, the quantity of the reflected light which arrives at the photo-sensitive element 24 is reduced.

Figure 9:
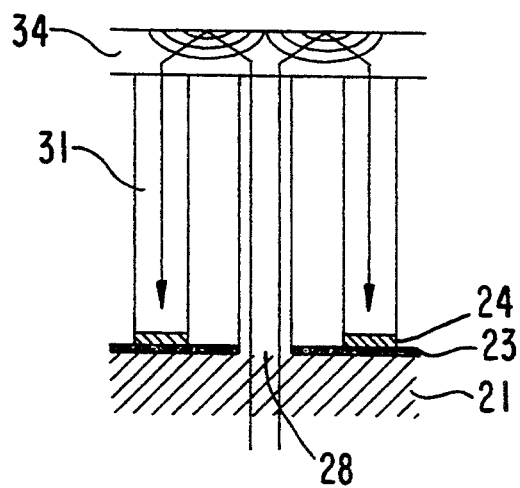
FIG. 9 is a sectional view showing details of a second embodiment of component 13 of FIG. 7.

A second embodiment of optical element 13 which defines optical paths is described below. In the construction shown in FIG. 9, a microlens array 34 is disposed on the upper face of a collected fiber member 31. The microlens array 34 can be produced by forming regions having different refractive index in a glass using ion diffusion. This layer 34 also serves as a protective film. Light arriving at the microlens array 34 is diverted as shown in FIG. 9 depending on the distribution of refractive index in the microlens array 34. The optical paths of the reflected light are similar to those in the case of the diffraction grating.

Figure 10:
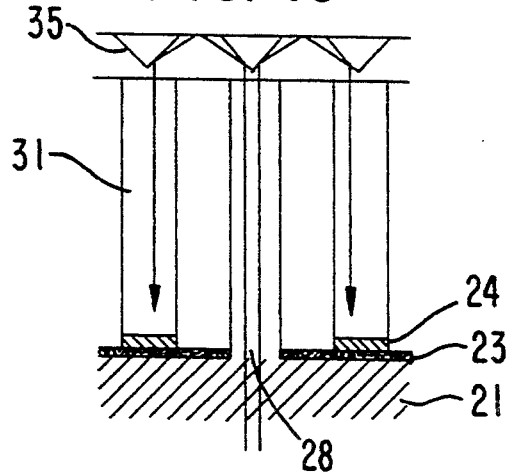
FIG. 10 is a sectional view showing details of a third embodiment of component 13 of FIG. 7.

A third embodiment of optical element 13 which defines optical paths is described as follows. In the construction shown in FIG. 10, a protective film 35 having V-shaped grooves formed thereon is disposed on the upper face of a collected fiber member 31. The V-shaped grooves can be produced by a method wherein a silicon wafer is etched anisotropically to form a mold, this mold is pressed against a plastic surface, and an evaporation coating of aluminum or the like is then applied to the plastic surface to form a mirrorlike surface. The light arriving at the protective film 35 in which V-shaped grooves are formed is reflected by the mirrorlike surface of the V-shaped grooves and diverted as seen in FIG. 10. The optical paths of the reflected light are similar to those in the case of diffraction gratings.

A fourth embodiment of the optical element 13 which defines optical paths is as follows: Similar effects also can be obtained by a modified construction wherein a collected fiber member 31 is removed from the constructions shown in FIGS. 8, 9 and 10. The modified construction is advantageous in that the structure is simplified as compared with constructions which include collected fiber members 31. However, since scattered light other than reflected light from a finger is admitted into the photo-sensitive element 24, the picture quality may possibly be degraded.

Figure 5A:
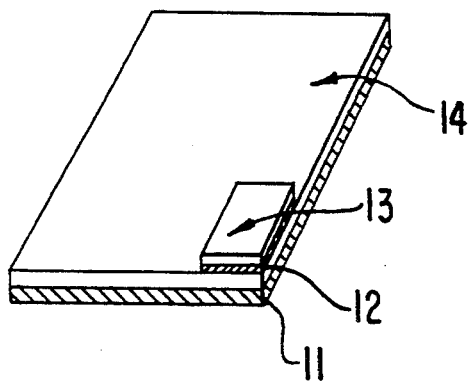
FIGS. 5A and 5B are perspective views showing a second embodiment of a fingerprint image input device of the present invention.
Figure 5B:
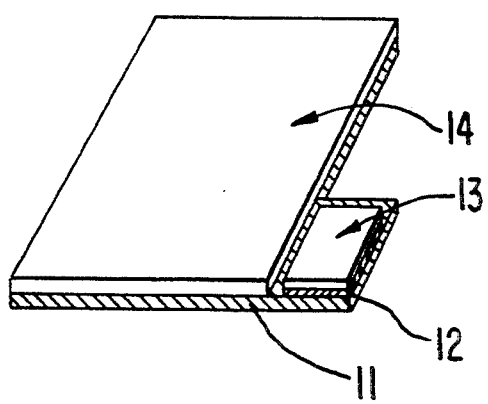

FIGS. 5A and 5B are perspective views showing a second embodiment of a thin fingerprint image input device of the present invention. A liquid crystal light valve 14, a two-dimensional image sensor 12 and optical element 13 which defines optical paths are disposed on a planar light source 11. In FIG. 5A, the area of the liquid crystal light valve 14 is partially or entirely covered with the two-dimensional image sensor 12 and optical element 13 which defines optical paths. While this arrangement is equivalent to the arrangement wherein part of a liquid crystal display is used as a planar light source, the arrangement is advantageous in that the amount of light and color can be controlled. Meanwhile, the remaining area of the liquid crystal light valve 14 which is not covered with the two-dimensional image sensor 12 or optical element 13 functions as an ordinary display unit. In FIG. 5B, a two-dimensional image sensor 12 and optical element 13 are disposed parallel to liquid crystal light valve 14 on the planar light source 11. In this construction, since the planar light source for the liquid crystal display is used also to input a fingerprint, there is an advantage in that no independent light source for inputting a fingerprint is required.

A fingerprint image input device incorporating a display device can be provided using the construction shown in FIGS. 5A or 5B. If the device is used in place of a display unit for a personal computer, collation of fingerprints can be employed in place of a password which is used at present for confidentiality and security of information, thereby achieving higher confidentiality and security. The display section of the present device functions as a display unit for an ordinary personal computer. Further, where the present device is used for collation of fingerprints for controlling entrance to and exit from a room, the display section of the device can display instructions to a person wishing to enter or exit the room. In any application of the device, reduction in size and cost of the device can be achieved by forming the display unit and the fingerprint image input device in a single body.

Figure 6:
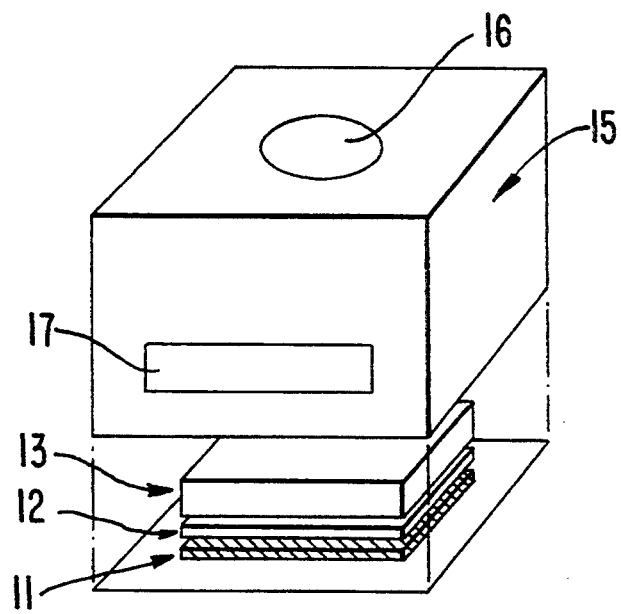
FIG. 6 is a perspective view showing a third embodiment of a fingerprint image input device of the present invention.

FIG. 6 is a perspective view showing a third embodiment of a thin fingerprint image input device of the present invention. A two-dimensional image sensor 12 and optical element 13 which defines optical paths are disposed on a planar light source on which a cover 15 is provided which includes therein a second optical element 16 comprising a lens and shutter and a hole 17 for insertion of a finger. A light absorbing substance is applied to the inner wall of the cover 15. The shutter for the optical element 16 and planar light source 11 are electrically coupled to each other so that, when the shutter is closed, the planar light source 11 is turned on. With the present construction, if a finger is inserted into the hole 17 and placed in close contact with the optical element 13, a fingerprint image of a high contrast is obtained, and if the shutter is put into an open state without inserting a finger into the hole 17, then a remote object can be focused upon the surface of the optical element 13 by the second optical element 16, and consequently, an image of a remote object can be inputted by means of the two-dimensional image sensor 12.

A fingerprint image input device which can also input the image of a remote object is realized using the construction shown in FIG. 6. When the present device is used in the collation of fingerprints to control entrance to and exit from a room, the shutter of the second optical element 16 is opened so that the device may function as a camera which monitors conditions around the door. When a person wishing to enter or exit the room performs collation of a fingerprint, the shutter of the second optical element 16 is closed, and the image of a fingerprint is inputted.

Figure 1:
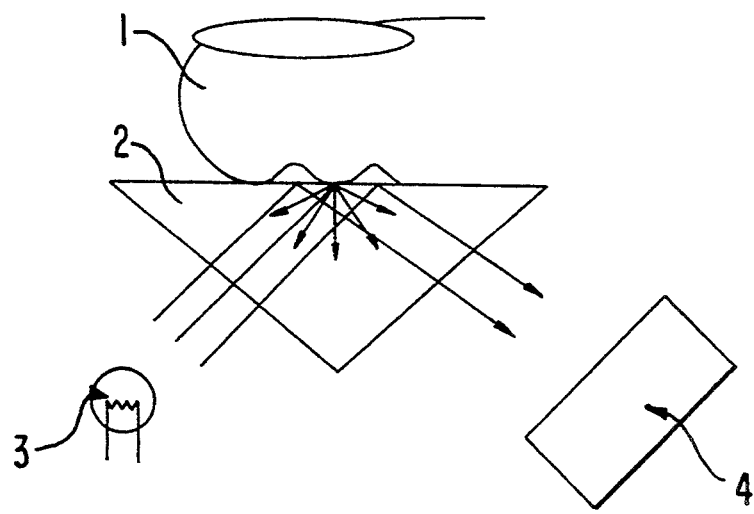
FIG. 1 is a block diagram showing an example of a conventional fingerprint image input device.
Figure 2:
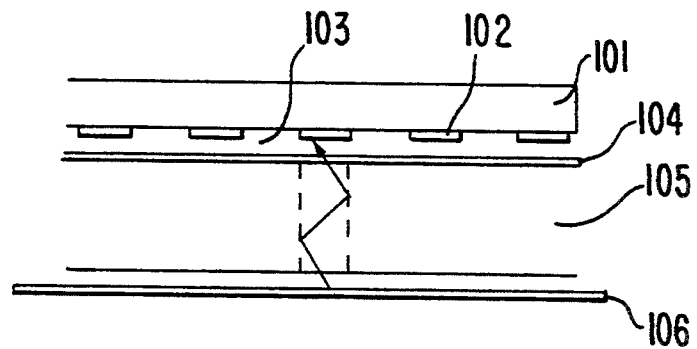
FIG. 2 is a block diagram showing an example of a conventional image sensor of the full contact type.
Figure 3:
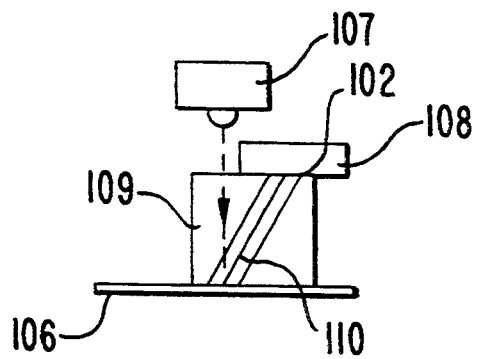
FIG. 3 is a block diagram showing another example of a conventional image sensor of the full contact type.

As described above, since the optical paths obtained in the present invention are equivalent to the optical paths of the conventional example of FIG. 1, an image of emphasized brightness can be obtained. Further, since the length of the optical paths in FIG. 7 is about 2 mm, there is an advantage in that a fingerprint image input device which is much thinner than that of FIG. 1 can be obtained. Additionally, when part of a liquid crystal display is used as a planar light source provided with a shutter, a thin fingerprint image input device with a display can be provided. Further, inputting of the image of a remote object can be achieved by covering the fingerprint image input device with a cover provided with a lens system.

What is claimed is:

1. A fingerprint image input device comprising a planar light source, a two-dimensional image sensor disposed on said planar light source and having openings for allowing light emitted from said planar light source to pass therethrough, and an optical means for guiding light that has passed through said openings so that the light can be applied obliquely onto a finger and guiding the reflected light from the finger to photo-sensitive element of said two-dimensional image sensor.

2. A fingerprint image input device as claimed in claim 1, wherein said optical means includes a diffraction grating and a protective film for protecting said diffraction grating from a finger.

3. A fingerprint image input device as claimed in claim 1, wherein said optical means includes a microlens array.

4. A fingerprint image input device as claimed in claim 1, wherein said optical means includes a protective film on which a plurality of V-shaped grooves are formed.

5. A fingerprint image input device as claimed in claim 2, wherein a collected fiber member which comprises a plurality of bundled optical fibers having light shielding side faces is interposed between the optical means and the two-dimensional image sensor.

6. A fingerprint image input device as claimed in claim 3, wherein a collected fiber member which comprises a plurality of bundled optical fibers having light shielding side faces is interposed between the optical means and the two-dimensional image sensor.

7. A fingerprint image input device as claimed in claim 4, wherein a collected fiber member which comprises a plurality of bundled optical fibers having light shielding side faces is interposed between the optical means and the two-dimensional image sensor.

8. A fingerprint image input device as claimed in claim 1, which comprises the planar light source, a liquid crystal light valve disposed on said planar light source and functioning as a shutter for the light from said planar light source, the two-dimensional image sensor, and the optical means, wherein said two-dimensional image sensor and said optical means are disposed so as to partly or entirely cover said liquid crystal light valve.

9. A fingerprint image input device as claimed in claim 1, comprising the planar light source, a liquid crystal light valve which is disposed on said planar light source and functions as a shutter for light from said planar light source, the two-dimensional image sensor, and the optical means, wherein said two-dimensional image sensor and said optical means are disposed parallel to said liquid crystal light valve.

10. A fingerprint image input device as claimed in claim 1, wherein a cover for covering said fingerprint image input device is provided, said cover having a second optical means thereon for forming an image of an object located outside said cover on said two-dimensional image sensor, said cover having a finger insertion hole for allowing the finger to be placed on said fingerprint image input device.

11. A fingerprint image input device, comprising a planar light source, a transparent substrate disposed on said planar light source, light shielding plates formed on said transparent substrate so as to provide openings two-dimensionally therebetween to allow the light emitted from said planar light source to pass through said openings, photo-sensitive elements formed two-dimensionally on said light shielding plates, switches for reading out signals from said photo-sensitive elements, switching lines and signal reading lines connected to said switches, bias applying lines connected to said photo-sensitive elements, a collected fiber member prepared by bundling a large number of optical fibers having light shielding side faces for guiding light that has passed through said openings and for guiding reflected light from a finger, a diffraction grating provided on a finger contacting side of said collected fiber member for guiding the light that has passed through said collected fiber member so as to apply the light obliquely onto the finger and guiding the reflected light from the finger to said photo-sensitive elements through said collected fiber member, and a transparent protective film for protecting said diffraction grating from the finger.

12. A fingerprint image input device as claimed in claim 11, wherein a cover for covering said fingerprint image input device is provided, said cover having a second optical means thereon for forming an image of an object located outside said cover on said two-dimensional image sensor, and said cover having a finger insertion hole for allowing the finger to be placed on said fingerprint image input device.

* * * * *